(12) United States Patent
Purcell et al.

(10) Patent No.: US 7,506,319 B2
(45) Date of Patent: Mar. 17, 2009

(54) GENERATING A MODEL OF SOFTWARE IN EXECUTION

(75) Inventors: Christopher John Purcell, Bath (GB); Robert Francis Berry, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 10/878,264

(22) Filed: Jun. 28, 2004

(65) Prior Publication Data
US 2004/0268297 A1 Dec. 30, 2004

(30) Foreign Application Priority Data
Jun. 26, 2003 (GB) ................... 0314874.9

(51) Int. Cl.
*G06F 9/44* (2006.01)
(52) U.S. Cl. ...................... 717/133; 717/125
(58) Field of Classification Search ................. 717/128, 717/133, 125
See application file for complete search history.

(56) References Cited

U.S. PATENT DOCUMENTS

| | | | | | |
|---|---|---|---|---|---|
| 4,316,245 | A | * | 2/1982 | Luu et al. ................... | 718/106 |
| 4,890,227 | A | * | 12/1989 | Watanabe et al. ............. | 706/14 |
| 5,598,562 | A | * | 1/1997 | Cutler et al. ................. | 718/104 |
| 5,664,088 | A | * | 9/1997 | Romanovsky et al. ........ | 714/13 |
| 5,680,589 | A | * | 10/1997 | Klingman .................... | 703/23 |
| 5,768,500 | A | * | 6/1998 | Agrawal et al. .............. | 714/47 |
| 6,126,329 | A | * | 10/2000 | Bennett et al. .............. | 717/127 |
| 6,817,011 | B1 | * | 11/2004 | Reynolds .................... | 717/130 |
| 6,880,130 | B2 | * | 4/2005 | Makowski et al. .......... | 715/763 |
| 2004/0064685 | A1 | * | 4/2004 | Nguyen et al. .............. | 712/227 |

OTHER PUBLICATIONS

Blumofe, R. D. and Leiserson, C. E. 1999. Scheduling multithreaded computations by work stealing. J. ACM 46, 5 (Sep. 1999), 720-748. DOI= http://doi.acm.org/10.1145/324133.324234.*

Hall, R. J. 1992. Call path profiling. In Proceedings of the 14th International Conference on Software Engineering (Melbourne, Australia, May 11-15, 1992). ICSE '92. ACM Press, New York, NY, 296-306. DOI= http://doi.acm.org/10.1145/143062.143147.*

W P Alexander et al, "A unifying approach to performance analysis in the Java environment" IBM Systems Journal, vol. 39, No. 1, 2000, pp. 118-133.

* cited by examiner

*Primary Examiner*—Tuan Q Dam
*Assistant Examiner*—James Rutten
(74) *Attorney, Agent, or Firm*—Hamilton & Terrile, LLP; Stephen A. Terrile

(57) ABSTRACT

A model of a software system under execution including: a representation of a first node corresponding to a first function executing in the software system which obtains access to a resource, with an indicator of a number of times the first function has been called in the software system; a representation of a second node corresponding to a second function executing in the software system while the resource is accessed, with an indicator of a number of times the second function has been called; a representation of a place holder node with an indicator that the place holder node has never been called in the software system; a representation of a first call from the first node to the place holder node; and a representation of a second call from the place holder node to the second node. The first and second calls correspond to the first function calling the second function in the software system.

10 Claims, 3 Drawing Sheets

GENERATING A MODEL OF SOFTWARE IN EXECUTION

FIELD OF THE INVENTION

This invention relates to the generation of a model of a software application in execution. In particular it relates to a method to generate a model which indicates the consumption of resources by an application in execution.

BACKGROUND OF THE INVENTION

A software application in execution can be modelled to illustrate the consumption of resources, such as use of a central processor unit (CPU) for a specific period of time, by consumers of resources, such as functions in the application. Such a model allows an analysis of the application by software analysts or analysis tools directed to a particular objective. For example, a model of the use of a CPU can be displayed on a screen and used by a software analyst to identify those functions in the software application that use the CPU for the most time.

An example of a model which is used to represent a software application in execution is the "arcflow" model and is described in "A Unifying Approach to Performance Analysis in the Java Environment" (Java is a trademark of Sun Microsystems, Inc.) by Alexander et al (IBM Systems Journal, Vol. 39 No. 1, 2000). The arcflow model illustrates the consumption of resources in an application by representing a set of consumers in the application as a set of interconnected nodes in a tree structure. For example, FIG. 1 is a conventional arcflow model for illustrating the use of a CPU by functions in a software application. The functions are represented as nodes in a tree structure, with node A 102 corresponding to a function A, node G 104 corresponding to a function G and so on. The arcflow model of FIG. 1 is described as a series of steps below:

1. Function A is called by another function in the application and is represented as node A 102;
2. Node A 102 calls node G 104 corresponding to function A calling function G to obtain access to a block of memory;
3. Node A 102 calls node B 106 corresponding to function A calling function B; and
4. Node A 102 calls node R 108 corresponding to function A calling function R to release the block of memory.

Each node also includes a numerical indicator in parentheses of a number of times the function to which the node corresponds has been called. For example, each function in FIG. 1 has been called one time.

The CPU is a mutually exclusive resource used by the functions of the application. Usage of the CPU is measured by the amount of time a function uses the CPU and is known as CPU time. Each node in an arcflow model usually includes an indicator of a total amount of a particular resource, such as CPU time, that has been consumed by a function to which the node corresponds. This indicator is excluded from FIG. 1 for clarity, but is clearly explained in the Alexander document cited above.

While the prior art model of FIG. 1 provides useful information regarding the function calls which consume CPU time in an application, it would be useful if the model could further provide information regarding which functions are involved in the consumption of a resource other than CPU time, in situations where the consumption of the resource takes place while several functions are called. For example, in the model of FIG. 1, it would be useful if the model could also provide information regarding which functions are called while the block of memory is being accessed by the application. However, the present state of the art does not provide this further information.

SUMMARY OF THE INVENTION

According to a first aspect, the present invention provides a model of a software system under execution comprising: a representation of a first node corresponding to a first function executing in the software system which obtains access to a resource, with an indicator of a number of times the first function has been called in the software system; a representation of a second node corresponding to a second function executing in the software system while the resource is accessed, with an indicator of a number of times the second function has been called; a representation of a place holder node with an indicator that the place holder node has never been called in the software system; a representation of a first call from the first node to the place holder node; a representation of a second call from the place holder node to the second node; and wherein the first and second calls correspond to the first function calling the second function in the software system.

According to a second aspect, the invention provides a computer program product for, when run on a computer, generating the model of the first aspect described above. According to a third aspect, the invention provides an apparatus for generating the model of the first aspect described above.

Thus with the present invention a place holder node is inserted into a model of an application in execution. The place holder node is used to indicate which functions are called while a resource is accessed by the application. A function which is called while the resource is accessed by the application is represented as a node called by the place holder node in the model. The model therefore provides information regarding which functions are called while the resource is being accessed by the application.

BRIEF DESCRIPTION OF THE DRAWINGS

Preferred embodiments of the present invention will now be described in detail by way of example only with reference to the following drawings.

For example.

DETAILED DESCRIPTION OF THE PREFERRED EMBODIMENTS

Figure 1:
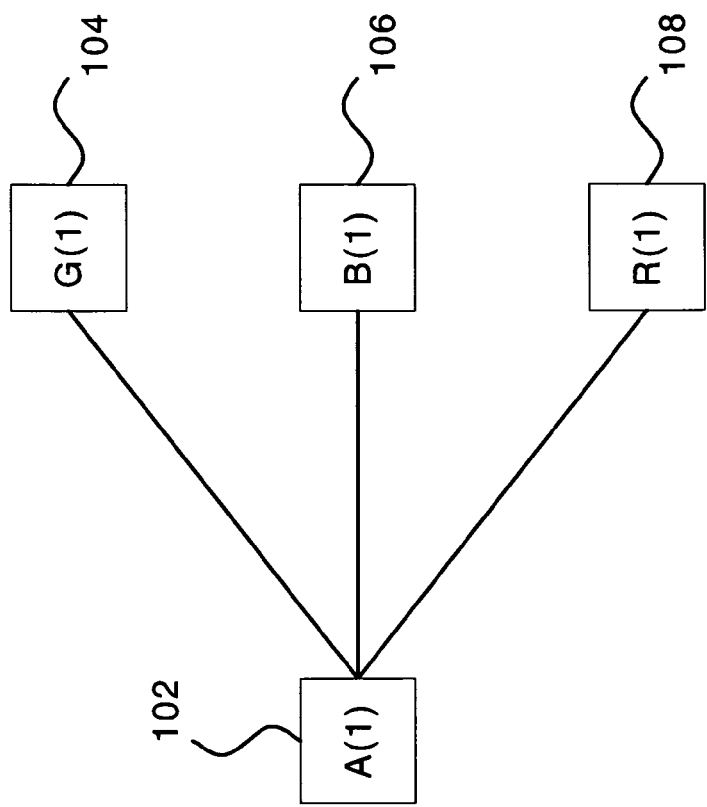
FIG. 1 is a conventional arcflow model for illustrating the use of a CPU by functions in a software application.
Figure 2:
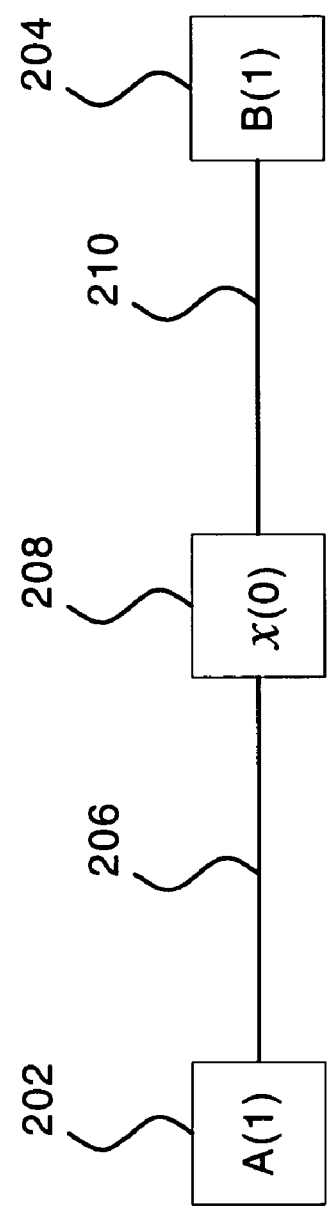
FIG. 2 illustrates an exemplary model according to a simplified example of the present invention.

In the example model of FIG. 2, a function A is called in the application and obtains access to a block of memory. The function A is represented as a node A 202 in the model of FIG. 2. Node A 202 includes an indication of a number of times function A has been called in parentheses. Function A calls a function B in the application while the block of memory is accessed by the application. Function B is represented as node B 204 in the model. Node B 204 also includes an indication of a number of times function B has been called in parentheses. Function A calling function B is represented in the model by a first function call 206 of node A 202 calling a place holder node X 208, and a second function call 210 of the place holder node X 208 calling the node B 204. Place holder node X 208 includes an indicator that the place holder node X 208 has never been called in the application, because place holder node X 208 does not represent a function which has been called. In fact place holder node X 208 does not represent a function at all, as it is merely placed in the model as a so-called place holder node. The place holder node X 208 is used to indicate which functions are called by function A while the block of memory is accessed by the application. A node which is represented as being called by the place holder node X 208, such as node B 204, corresponds to a function which is called in the application while the block of memory is accessed by the application. Although node B 204 is represented as being called by the place holder node X 208, the function B corresponding to node B 204 is not actually called by the place holder node X 208 because function B is called by function A in the application. Nodes A 202 and B 204 may additionally include indicators of a total amount of CPU time that has been consumed by functions A and B respectively, though this is excluded from the model of FIG. 2 for clarity. From the model of FIG. 2 a software analyst can determine that function B is called while the block of memory is accessed by the application because node B 204 corresponding to function B is represented as being called by the place holder node X 208 which indicates which functions are called by function A while the block of memory is accessed by the application.

In use, the model of FIG. 2 is represented in a data structure stored in a memory of a computer system, or alternatively in a file stored on a storage device of a computer system or computer readable storage medium. The model can also be represented pictorially by displaying the model on a screen of a computer system or printing the model on paper. Additionally, while a block of memory has been described above as the resource, function A could alternatively obtain access to a different resource which is used by more than one function in the application, such as a communications socket, a synchronisation lock or an object in an object oriented environment.

An example of how the simplified model of FIG. 2 is used in a typical real world use of the invention is now considered. In the more detailed example model of FIG. 3, a function A is called in the application and is represented as a node A 302. Function A obtains access to a block of memory by calling a resource accessor function which is represented as a resource accessor node G 304. The call to the resource accessor function is indicated by function call 306. Node A 302 and the resource accessor node G 304 each includes an indication of a number of times the respective function has been called in parentheses. A function call 310 of the resource accessor node G 304 calling a first memory node 308 represents the resource accessor function obtaining access to the block of memory. The first memory node 308 does not represent a function which has been called, rather it represents the block of memory which has been accessed by the resource accessor node G 304 and is used to indicate which function obtains access to the block of memory in the application, i.e. the resource accessor function obtains access to the block of memory because the resource accessor node G 304 is represented as calling the first memory node 308. The first memory node 308 includes an indicator, of a number of blocks of memory accessed by the application, in parentheses. For example, the first memory node 308 of FIG. 3 includes an indicator that one block of memory is accessed by the application.

Function A, represented as node A 302, next calls a function B in the application while the block of memory is accessed by the application. Function B is represented as node B 312 in the model. Node B 312 also includes an indication of a number of times function B has been called in parentheses. Function A calling function B is represented in the model by a first function call 314 of node A 302 calling a memory place holder node 316, and a second function call 318 of the memory place holder node 316 calling the node B 312. The memory place holder node 316 includes an indicator that the memory place holder node 316 has never been called in the application, because the memory place holder node 316 does not represent a function which has been called. In fact the memory place holder node 316 does not represent a function at all, as it is merely placed in the model as a place holder node. The memory place holder node 316 is used to indicate which functions are called by function A while the block of memory is accessed by the application. A node which is represented as being called by the memory place holder node 316, such as node B 312, corresponds to a function which is called in the application while the block of memory is accessed by the application. Although node B 312 is represented as being called by the memory place holder node 316, the function B corresponding to node B 312 is not actually called by the memory place holder node 316 because function B is called by function A in the application. The memory place holder node 316 and the first memory node 308 have the same label, "MEMORY", to indicate that the memory place holder node 316 and the first memory node 308 relate to the same block of memory.

Function A, represented as node A 302, subsequently calls a resource releaser function which releases access to the block of memory and which is represented by two nodes in the model: a first resource releaser node R 322; and second resource releaser node R 326. A first part of the resource releaser function executes while the block of memory is accessed by the application and is represented by the first resource releaser node R 322, and a second part of the resource releaser function executes while the block of memory is no longer accessed by the application and is represented by the second resource releaser node R 326. The first resource releaser node R 322 and the second resource releaser node R 326 have the same label, "R", to indicate that the first resource releaser node R 322 and the second resource releaser node R 326 correspond to the resource releaser function.

The first resource releaser node R 322 includes an indication of a number of times the resource releaser function has been called in parentheses. Function A calling the resource releaser function is represented in the model by a first function call 314 of node A 302 calling the memory place holder node 316, and a second function call 320 of the memory place holder node 316 calling the first resource releaser node R 322. Because the first resource releaser node 322 is illustrated as being called by the memory place holder node 316, the model indicates that the first part of the resource releaser function to which the node R 322 corresponds is called while the block of memory is accessed by the application.

The second resource releaser node R 326 includes an indication that the second resource releaser node R 326 has never been called because the second resource releaser node R 326 does not correspond to a function which is called in the application. Rather, the second resource releaser node R 326 corresponds to the second part of the resource releaser function which executes while the block of memory is no longer accessed by the application. To indicate that the second part of the resource releaser function executes when the block of memory is no longer accessed by the application, the second resource releaser node 326 is represented as being called directly by node A 302 using function call 324. Because the second resource releaser node 326 is not represented as being called by the memory place holder node 316, it is clear that the second part of the resource releaser function corresponding to the second resource releaser node 326 does not execute while the block of memory is accessed by the application.

Figure 3:
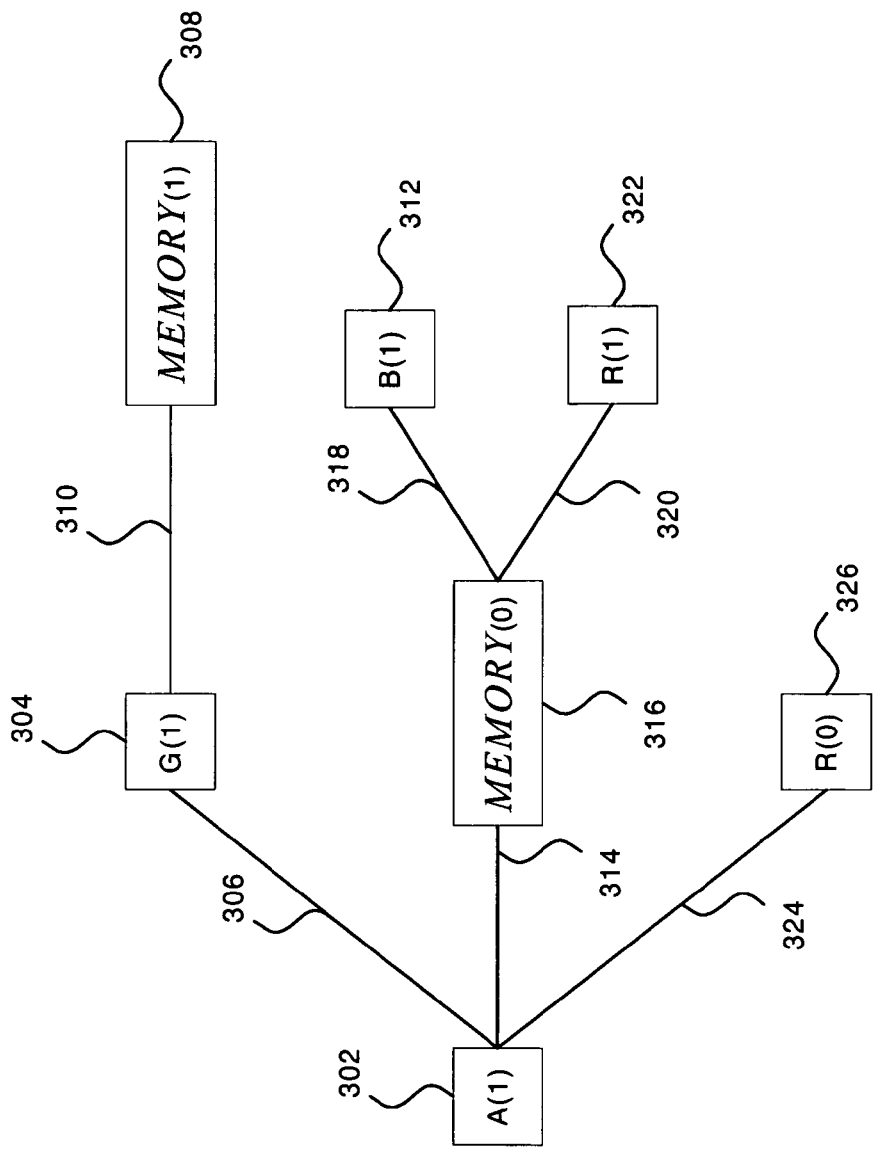
FIG. 3 illustrates an exemplary model according to a more detailed example of the present invention.

Nodes A 302, G 304, B 312, R 322 and R 326 may additionally include indicators of a total amount of CPU time that has been consumed by the functions corresponding to the nodes respectively, though this is excluded from the model of FIG. 3 for clarity.

From the model of FIG. 3 a software analyst can determine that the resource accessor function obtains access to the block of memory because the first memory node 308 corresponding to the block of memory is represented as being called by resource accessor node G 304 corresponding to the resource accessor function. A software analyst can also determine that both function B and the resource releaser function are called while the block of memory is accessed by the application because node B 312 and the first resource releaser node 322 are represented as being called by the memory place holder node 316 which indicates which functions are called by function A while the block of memory is accessed by the application. Furthermore, because the first resource releaser node 322 is represented as being called by the memory place holder node 316, and the second resource releaser node 326 is represented as being called directly by node A 302, a software analyst can determine that a first part of the resource releaser function executes while the block of memory is accessed by the application and a second part of the resource releaser function executes while the block of memory is not accessed by the application. This indicates to a software analyst that the resource releaser function has released the block of memory.

While the preferred embodiments have been described here in detail, it will be clear to those skilled in the art that many variants are possible without departing from the spirit and scope of the present invention.

The invention claimed is:

1. A computer program product comprising computer program code stored on a tangible computer readable storage medium which, when executed on a data processing system, instructs the data processing system to generate a model comprising:
   a representation of a first node corresponding to a first function executing in the software system which obtains access to a resource, with an indicator of a number of times the first function has been called in the software system;
   a representation of a second node corresponding to a second function executing in the software system while the resource is accessed, with an indicator of a number of times the second function has been called;
   a representation of a place holder node with an indicator that the place holder node has never been called in the software system, the representation of the place holder node has never been called further indicating that the place holder node does not represent a function;
   a representation of a first call from the first node to the place holder node;
   a representation of a second call from the place holder node to the second node; and
   wherein the first and second calls correspond to the first function calling the second function in the software system and the model of the software system under execution provides information regarding which functions are called while the resource is being accessed.

2. The computer program product of claim 1 wherein the resource is a block of memory.

3. The computer program product of claim 1 wherein the resource is a communications socket.

4. The computer program product of claim 1 wherein the resource is a synchronisation lock.

5. The computer program product of claim 1 wherein the resource is a software object.

6. The computer program product of claim 1 wherein the representation is created on a screen.

7. The computer program product of claim 1 wherein the representation is created in a data structure stored in a memory of a computer system.

8. The computer program product of claim 1 wherein the representation is created in a file.

9. An apparatus for illustrating function calls that are made in an object oriented software system comprising:
   means for generating a representation of a first node corresponding to a first function executing in the software system which obtains access to a resource, with an indicator of a number of times the first function has been called in the software system;
   means for generating a representation of a second node corresponding to a second function executing in the software system while the resource is accessed, with an indicator of a number of times the second function has been called;
   means for generating a representation of a place holder node with an indicator that the place holder node has never been called in the software system, the representation of the place holder node has never been called further indicating that the place holder node does not represent a function;
   means for generating a representation of a first call from the first node to the place holder node;
   means for generating a representation of a second call from the place holder node to the second node; and
   wherein the first and second calls correspond to the first function calling the second function in the software system and the model of the software system under execution provides information regarding which functions are called while the resource is being accessed.

10. A computer implementable method for illustrating function calls that are made in an object oriented software system comprising:
    generating a representation of a first node corresponding to a first function executing in the software system which obtains access to at least one of a plurality of resources, with an indicator of a number of times the first function has been called in the software system;
    generating a representation of a second node corresponding to a second function executing in the software system while the resource is accessed, with an indicator of a number of times the second function has been called;
    generating a representation of a place holder node with an indicator that the place holder node has never been called in the software system, the representation of the place holder node has never been called further indicating that the place holder node does not represent a function;
    generating a representation of a first call from the first node to the place holder node;
    generating a representation of a second call from the place holder node to the second node; and
    wherein the first and second calls correspond to the first function calling the second function in the software system and the model of the software system under execution provides information regarding which functions are called while the resource is being accessed; and,
    wherein the plurality of resources comprise a block of memory, a communications socket, a synchronisation lock, and a software object.

* * * * *